United States Patent
Iizuka et al.

[19]

[11] Patent Number: 5,851,478
[45] Date of Patent: Dec. 22, 1998

[54] MOLDING METHOD AND COOLING APPARATUS FOR PRESSURE RESISTING BOTTLES OF SYNTHETIC RESIN

[75] Inventors: Takao Iizuka; Mamoru Oshida; Makoto Takada, all of Tokyo, Japan

[73] Assignee: Yoshino Kogyosho Co., Ltd., Tokyo, Japan

[21] Appl. No.: 690,803

[22] Filed: Aug. 1, 1996

Related U.S. Application Data

[63] Continuation of Ser. No. 211,165, filed as PCT/JP93/01011, Jul. 20, 1992, Pat. No. 5,585,125.

[30] Foreign Application Priority Data

Jul. 20, 1992 [JP] Japan ................................. 4-214533

[51] Int. Cl.⁶ ............................................... B29C 49/66
[52] U.S. Cl. ......................... 264/520; 264/528; 264/534; 425/526
[58] Field of Search .................... 264/520, 528, 264/530, 534, 905, 904, 903; 425/526; 215/375

[56] References Cited

U.S. PATENT DOCUMENTS

| | | | |
|---|---|---|---|
| 3,910,746 | 10/1975 | Mrusek et al. | 425/526 |
| 4,035,455 | 7/1977 | Rosenkranz et al. | 264/534 |
| 4,267,144 | 5/1981 | Collette et al. | 264/523 |
| 4,411,610 | 10/1983 | Poppe et al. | 425/526 |
| 4,522,779 | 6/1985 | Jabarin | 264/905 |
| 4,853,171 | 8/1989 | Ajmera | 264/905 |
| 4,883,631 | 11/1989 | Ajmera | 264/528 |
| 5,035,931 | 7/1991 | Yamada et al. | . |
| 5,281,387 | 1/1994 | Collette et al. | 264/520 |
| 5,419,866 | 5/1995 | Valyi | 264/530 |

FOREIGN PATENT DOCUMENTS

| | | | |
|---|---|---|---|
| 57-053326 | 3/1982 | Japan | 264/905 |
| 2-74319 | 3/1990 | Japan | . |
| 2-127023 | 5/1990 | Japan | . |
| 3-9831 | 11/1991 | Japan | . |

*Primary Examiner*—Catherine Timm
*Attorney, Agent, or Firm*—Oliff & Berridge, PLC

[57] ABSTRACT

A biaxially stretched blow molded bottle of a synthetic resin having a big foot type petaloid bottom is produced in a blow time of not more than 3 seconds, and after the bottle has been released from the mold, the temperature of the bottom portion of the bottom does not rise higher than 70° C., thereby supplementing the capability of the metal mold for cooling the bottom portion. Thus, irregular deformation of the central part of the bottom portion is prevented, molding of the bottom portion with high pressure resisting and mechanical strength is achieved to avoid breakage, and a sufficient height of the central part of the bottom portion is ensured. Additionally, productivity of pressure resisting bottles is improved by reducing the blow time from 4–5 seconds to not more than 3 seconds.

8 Claims, 5 Drawing Sheets

MOLDING METHOD AND COOLING APPARATUS FOR PRESSURE RESISTING BOTTLES OF SYNTHETIC RESIN

This is a Continuation of application Ser. No. 08/211,165 filed Jun. 21, 1994, now U.S. Pat. No. 5,585,125, which is the U.S. national stage of PCT International Application No. PCT/JP93/01011 filed Jul. 20, 1993.

TECHNICAL FIELD OF THE INVENTION

The present invention relates to molding and cooling apparatus for pressure resisting bottles of synthetic resin, especially polyethylene terephthalate resin (hearinafter called PET).

BACKGROUND OF THE INVENTION

Recently, among biaxially stretched big PET bottles such as 1.5 litter bottles, so-called big foot type petaloid bottles, which is composed of only bottle body having self-standing function, have been widely used instead of prior bottles, which is composed of bottle body having round bottom portion and base cup attached to the round bottom portion. The bottom portion of the big foot type petaloid bottle has complex structure to enables itself to keep standing and to resist against the inner pressure. It does not require a base cup, so that compared to the prior bottle, it has higher productivity and less scrap problem after use.

The distribution of wall thickness of, for example, a 1.5 litter pressure resisting bottle is such as shown in FIG. 4 that the central part 6 (the range of 40 φ of the undersurface of the bottom portion 3) is thicker than that of the leg portion 3 and the valley portion 5 as shown by the line a, and the thickness thereof is more than 2 mm.

The central part 6 of the bottom 3 is required to be thick, because if it is thinner, it lacks mechanical strength and induces crazing and bottom-breakage because of high temperature and high pressure after substance is filled In the bottle.

Therefore, the bottom part 6 of the bottle should be thicker compared to the rest parts. However, since the bottom part 6 is thicker, the cooling speed thereof by blow mold to a certain point (normally, to the temperature of glass transition point of synthetic resin), so that when blowing time Is short and the center part 6 is not cooled enough, the center part 6 of the bottle projects outwardly, as shown in FIG. 8, after released from the mold.

To prevent deformation of the center part 6, in the past, blowing time is set more than 4 seconds to cool the center part 6 by a blow mold to a certain temperature. The temperature characteristic curve b in FIG. 5 shows a relationship between blow time and temperature of the center part 6, which is measured 7 seconds after a bottle is released from a blow mold. It is clear from this temperature characteristic curve b that to prevent deformation of the center part 6 and to cool it below the glass transition point, blow time of longer than 4 seconds is required.

FIG. 6 shows an variation characteristic of blow time which varies depending on the height H (see FIG. 8) between the bottom edged of the leg portion 4 and the center undersurface of the center part 6. In this FIG. 6, the characterist curve c1 indicates that 1 second of blow time is applied, c2 indicates 2 seconds of blow time, c3 indicates 3 seconds of blow time, c4 Indicates 4 seconds of blow time, c5 indicates 5 seconds of blow time and c6 indicates 7 seconds of blow time. It is known from the experience that the height H of 4.0 mm or more is acquired, crazing and breakage are prevented. According to FIG. 6, more than 4 seconds of blow time is required.

However, in case more than 4 seconds of blow time is applied, the productivity do not improve.

To increase the productivity, number of ideas such as to improve the cooling capacity of a blow mold or to make the wall of a blow mold thinner, thereby affecting the cooling agent to the mold face of the blow mold. However, still such ideas do not efficiently cool the center part of a bottle, and the cost for equipment will raise.

Therefore, the object of the present invention is to shorten the blow time and improve productivity, and also to improve the mechanical strength of the bottom portion of the bottle.

DESCRIPTION OF THE INVENTION

To satisfy the object of the invention, the structure of the present invention is as follows.

Molding method for pressure resisting bottles of synthetic resin is such that the bottle is blowed in a blow mold for about 2 seconds of blowing time, and within 4 seconds after the bottle is released from the blow mold, the center part of the bottom portion of the bottle is compulsively cooled below about 70° C. within a time of 5.5 seconds to 7.0 seconds.

Another molding method for pressure resisting bottles of synthetic resin comprising a big foot type petaloid bottom is such that the bottle is blow molded with a blowing time of about 1.5 seconds to 3.0 seconds, and within 15 seconds after the bottle is released from the blow mold, the projecting deformation, which is formed after the releasing, of the center part of the bottom portion is forced to the reform jig and is pushed back to the original position at maximum, while the inside the bottle is pressured, and the center part is cooled below about 70° C.

Another molding method for pressure resisting bottles of synthetic resin comprising a big foot type petaloid bottom is such that the bottle is blow molded with a blowing time of about 1.5 seconds to 3.0 seconds, and within 15 seconds after the bottle is released from the blow mold, the center part of the bottom portion is forced to a double-form jig to raise higher the height of the center portion, while the inside the bottle is pressured and the center part is cooled below about 70° C.

A cooling apparatus for pressure resisting bottles of sythetic resin having a big foot type petaloid bottom for cooling the bottom right after the bottle is released from a blow mold comprises: a reform jig comprising a mold face, the projecting height of the center part thereof is almost similar to the height of the center part of a bottom mold of a molding device and the rest portion being similar thereto, a jet mouth for cooling air being formed at the center part of the mold face; a press jig capable of holding the bottle cooperated with the reform jig, thereby pressing the bottom portion to a mold surface of the reform jig; and a cooling nozzle capable of entering inside the bottle, thereby blewing the air upper surface of the bottom portion and giving pressure inside the bottle.

Another cooling apparatus for pressure resisting bottles of sythetic resin having a big foot type petaloid bottom for cooling the bottom right after the bottle is released from a blow mold comprises: a double-form jig comprising a mold face, the projecting height of the center part thereof is almost similar to the height of the center part of a bottom mold of a molding device and the rest portion being similar thereto, a jet mouth for cooling air being formed at the center part of the mold face; a press jig capable of holding the bottle cooperated with the reform jig, thereby pressing the bottom portion to a mold surface of the reform jig; and a cooling nozzle capable of entering inside the bottle, thereby blewing the air upper surface of the bottom portion and giving pressure inside the bottle.

The function of the present invention will be described below.

As shown in FIG. 6, even only 2 seconds of blow time is applied, within 4 seconds after released from a blow mold, the height H of the bottle remains more than 4 mm. Therefore, by cooling a bottle with 2 seconds of blow time, and by compusively and rapidly cooling the bottom thereof within 4 seconds after released from a blow mold, the height H of the center part of the bottom portion of the bottle maintains higher than 4 mm.

By arranging the compulsive rapid cooling of the bottom portion of the bottle as such that the temperature of the ceter part of the bottom portion decreases below 70° C. within 5.5 to 7.0 seconds. deformation of the center part caused by high heat (about 80° C. when measured), which comes out of the surface after 25 to 30 seconds after released from the mold, is prevented and that cooling and hardening of the bottom portion can be completed.

When blow time is 1.5 to 3.0 seconds, the height becomes less than 4 mm within 15 seconds after released from the blow mold, and even after 15 seconds, the height of the bottom portion gradually decreases. This indicates that within 15 seconds after a bottle is released from the blow mold, the center part of the bottom portion can be deformed by an outer force.

According to various experimental tests, it is examined that the center part of the bottom portion of a bottle can be deformed to desired shape by an outer force only when the deformation is applied within 15 seconds after the bottle is released from the mold because of an cooling effect in the atmosphere.

By forcing the center part of the bottom portion of the bottle, which projects outwardly, to a reform jig within 15 seconds after release, the projected center part return to a position of blow molding, the maximum returning position, by repulsive force of the reform jig and then cooled and hardened at the position.

By applying pressure in the bottle while the bottom portion thereof is forced to the reform jig, the rest parts of the bottom portion of the bottle such as leg and valley portions do not deform because the pressure affects force to those portions. The compulsive cooling against the bottom portion may be such that the center part is cooled below 70° C. within the shortest period of time and the cooling time is not necessarily limited to a certain range.

By increasing the height of the bottom portion, the resistant strength of the bottom portion of the bottle can be improved, but when the height is set higher by arranging a blow mold, the extension ratio of the leg portion increases resulting such that formative ability of the bottle decreases and voids are produced.

To avoid such inconveniences, the height of the bottom portion is set a little lower than the final product at a process of blowing in a blow mold, and after releasing the bottle from the mold, the center part is deformed by a double-form jig instead of the reform jig until the center part comes up to the position higher than the previous position formed by the mold, and is cooled and hardened.

In taking such process, a compulsive shape of the bottom portion is smoothly blow molded and the height can be maintained high enough, so that the bottle is resistable against high pressure and the bottom thereof does not induce breakage.

A cooling process according to the cooling apparatus is performed such that a bottle released from a blow mold is attached to a reform jig facing the bottom portion of the bottle to the form surface of the jig, and the mouth portion of the bottle is pushed downward by a press jig, reforming the center part of the bottom portion to the original shape and height,the maximum height, formed in the mold.

While pressing the mouth portion of the bottle by the press jig, the cooling air is provided through cooling nozzle, which cools the upper surface of the bottom portion of the bottle and gives pressure inside of the bottle. At the same time, the cooling air is flowed from the flow mouth of the reform jig, which cools the undersurface of the bottom portion and harden the center part thereof. The center part of the bottom portion returns to the original shape formed in the mold.

When a double-form jig is applied instead of a reform jig, a similar process as described above is used, and the height of the bottom portion is pushed upward by the jig forming thereof higher than the previous.

PREFERRED EMBODIMENT OF THE INVENTION

Figure 1:
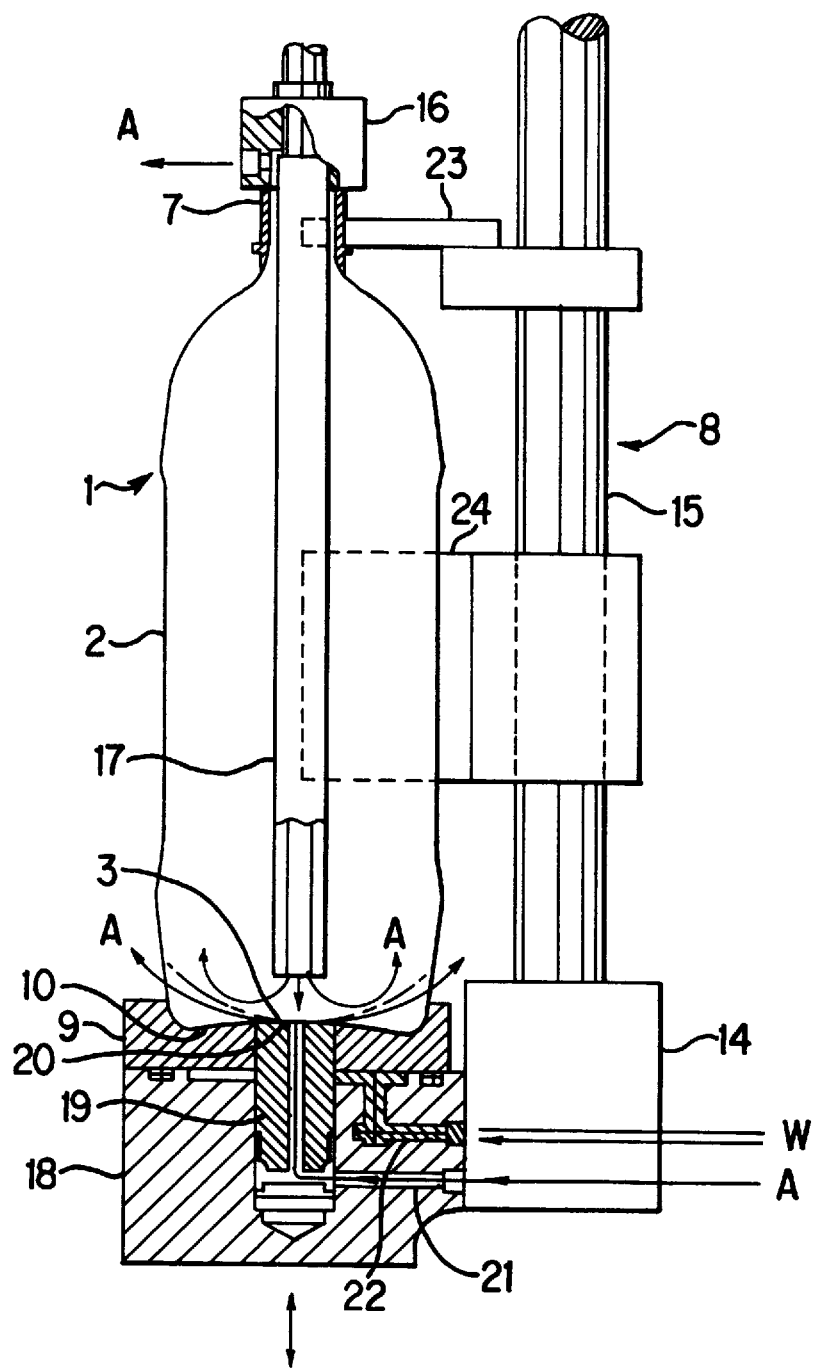
FIG. 1 shows a partial elevation view of a preferred embodiment of an apparatus according to the present invention.

Preffered embodiment according to the present invention will be described below referring to the drawings.

FIG. 1 shows a partial elevation view of a cooling apparatus according to the present invention, wherein a shaft 15 is secured standing position to a base block 14, a holder 23 which holdes a mouth portion 7 of a bottle 1 and a handler 24 which holds a body 2 are fixed to the shaft 15, a cooling block 18 positioned below the handler 24 is secured to the base block 14.

On the cooling block 18, there is a reform jig 9 comprising a mold surface 10 which is such that the projecting central portion thereof is arranged almost similar to the form surface of a bottom mold of a blow moulding device and the rest portion of the mold surface 10 is arranged similar thereto. The reform jig 9 is cooled by the cooling water W that flows through a cooling passage 22 provided in the cooling block 18. A passage block 19, forming air cooling passage 21 of the cooling block 18, runs in the center of the reform jig 9 in the downward direction. The upper surface comprising recess 20 for the cooling air A to escape is positioned at the center of the mold surface 10 of the reform jig 9, and the front edge of the air cooling passage 21 is positioned as a jet mouth of the cooling air A.

To an upper portion of the shaft 15, a cooling nozzle 17 is fixed capable of moving upward and downward directions. A press jig 16 is fixed to the cooling nozzle 17. The press jig 16 comprises passages throughwhich the air in the bottle escapes when the jig 16 is air sealed by the mouth portion 7 of the bottle.

The cooling nozzle 17 moves in the downward direction by a cylinder (not shown) and enter in the bottle 1 through the mouth portion 7. The press jig 16 is arranged such that when the bottom edge of the cooling nozzle 17 comes close to the center part 6 of the bottom portion 3, it pushes the upper surface of the mouth portion 7.

The cooling block 18 is capable of moving downwardly and upwardly between the length a little longer than the height of the mold surface 10 of the reform jig 9. The holder 23 and the handler 24 lightly hold the bottle 1 as to prevent the bottle 1 to move, and they enable the bottle 1 to move in the downward and upward directions.

To the preferred embodiment shown in FIG. 1, a bottle 1 which is released from a mold 7 seconds ago is attached, and the bottle is pressed by the press jig 16 with 25 kg/f, and the cooling air A of 6.5 kg/cm$^2$ is supplied through the cooling nozzle 17 and the cooling passage 21. By keeping the inner pressure of the bottle 6 kg/ cm$^2$, the center part 6 of the bottom portion 3 is compulsively cooled for 5.5 seconds, while releasing the cooling air A through two passages of 1.5 mm φ of the press jig 16.

This tests are applied for bottles which have received 1.5 second, 2.0 second, 2.5 second and 3.0 second of air blow. According to the bottles to which compulsive cooling process is applied according to the the present invention, the heights H of the bottom portions of the bottles 1 are all 4.2 mm. On the other hand, according to the bottles to which no cooling process is applied, the heights H are 2.0 mm with 1.5 second blow, 2.3 mm with 2.0 second blow, 2.7 mm with 2.5 second blow and 3.2 mm with 3.0 second blow. All of them are under 4.0 mm.

Tests for examine breakage of the bottom portion of the bottle is also done using bottles blowed for 2.5 seconds of blow time. The bottles being received the compulsive cooling according to the present invention, none out of 20 bottles occured breakage, whereas the bottles not being received the cooling, 18 bottles out 20 occured breakage.

Figure 2:
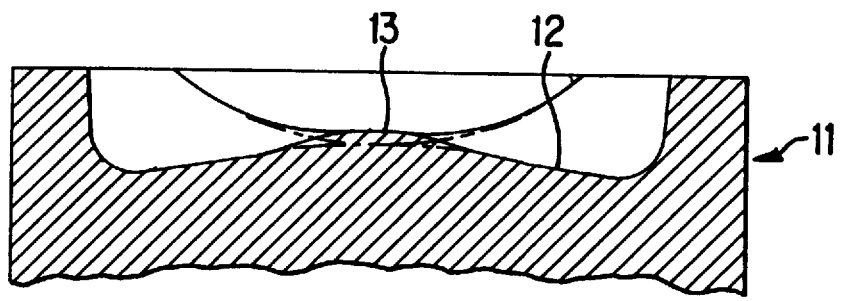
FIG. 2 shows a sectional view of a double-form jig of the apparatus according to the present invention.
Figure 3:
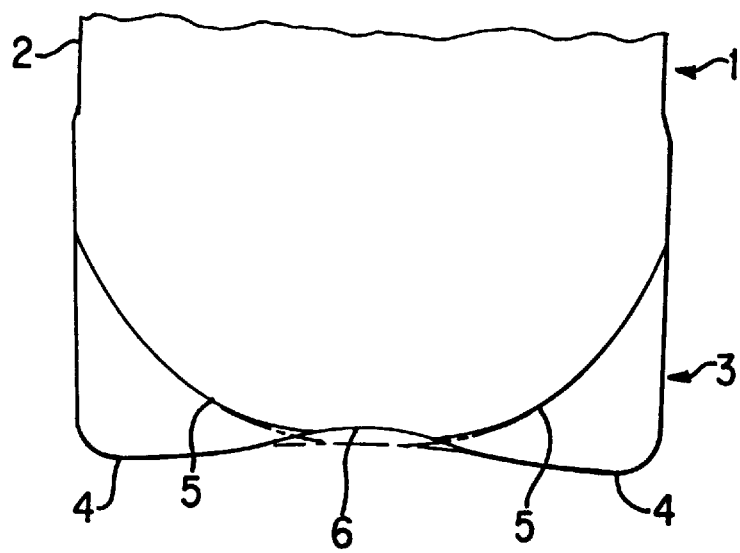
FIG. 3 shows a sectional view of a bottom portion of a bottle reformed by a double-form jig shown in FIG. 2.
Figure 4:
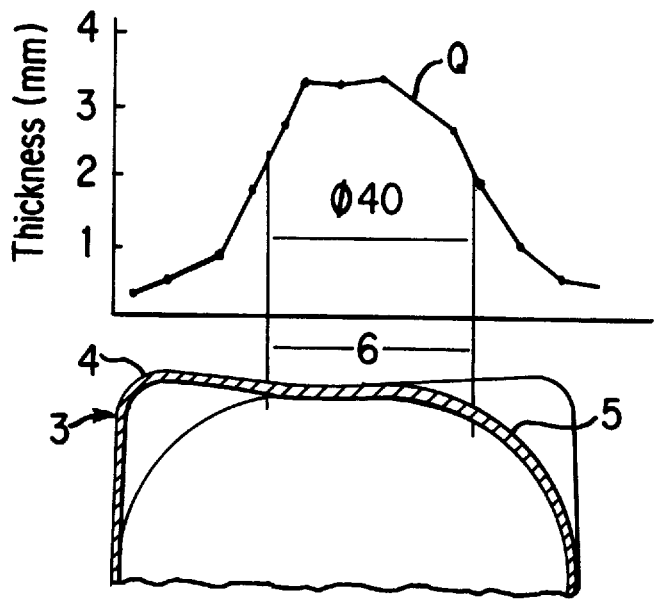
FIG. 4 shows a graph of a distribution of a wall thickness of a bottom portion.
Figure 5:
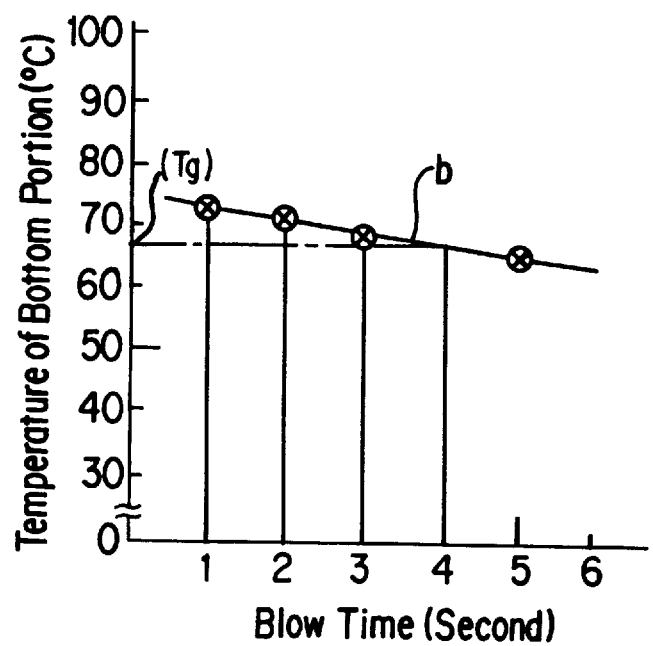
FIG. 5 shows a graph of temperature characteristic of a center part of the bottom portion against blow time of a bottle.
Figure 6:
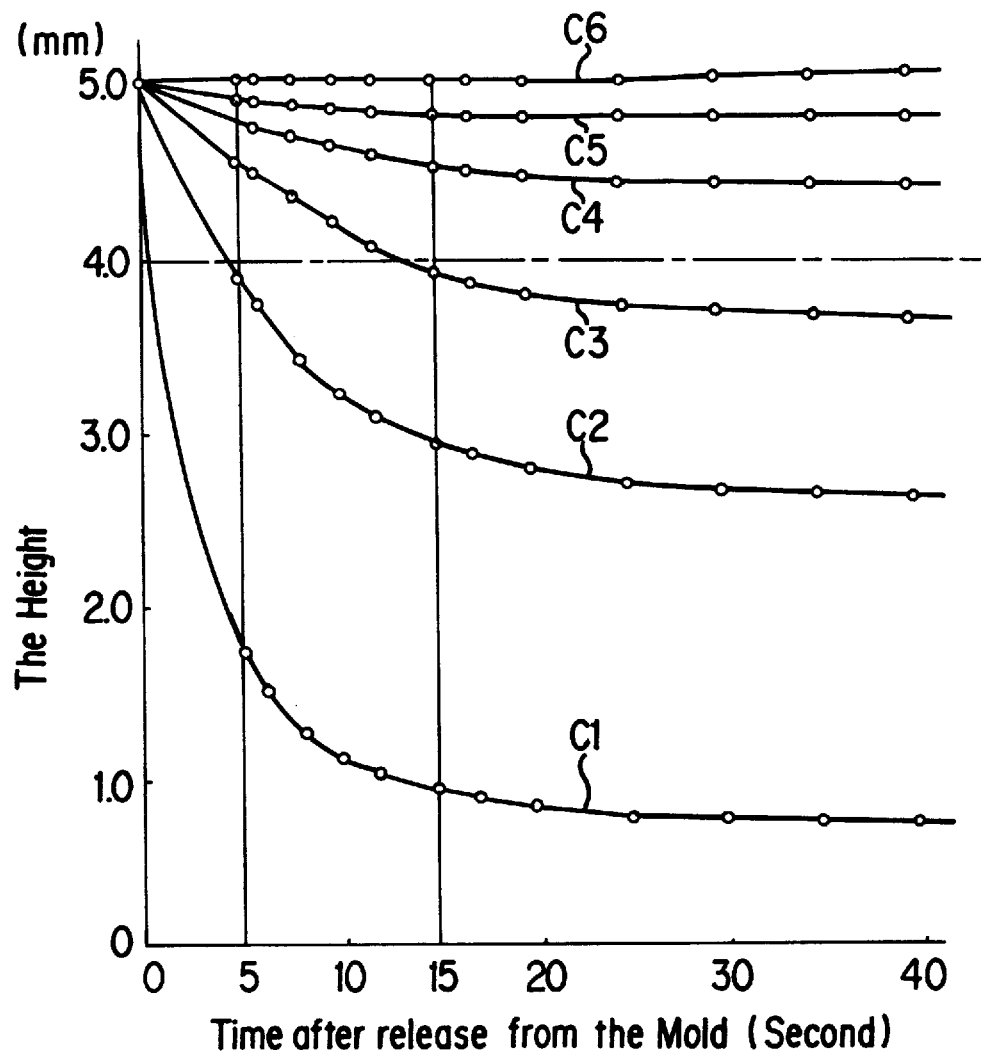
FIG. 6 shows a graph of a various characteristic of the height according to various blow time after release from the mold.

In FIG. 2, the center face 13 of the mold surface 12 of the double-form jig projects higher than the mold surface, which is indicated by a dot line in the FIG. 2, of the bottom mold of the blow molding device. Therefore, the bottom portion 3 of the bottle 1 completed by the double-form jig 11 is such as shown in FIG. 3 that the center part 6 thereof is recessed inwardly compared to the dot line, and that the radius of curve ration of the leg portion 4 toward inside becomes smaller and that of the center part of the valley portion 5 becomes larger.

The reformation of the center part 6 has limitation.

A bottle 1 is blow molded for 2 second of blow time in a blow mold whose height of the bottom mold is 3.9 mm. The bottle, 5 seconds later it is released from the mold, is reformed and cooled in the cooling apparatus 8 shown in FIG. 1 comprising double-form jig 11. When a double-form jig 11 comprising the height of 5 mm, the reform quantity is 1.1 mm, the height thereof is 4.43 mm and the mold ratio is 114%. When the double-form jig 11 with the height of 6 mm is applied, the reform ratio is 2.1 mm, the height thereof is 5.49 mm and the reform ration is 141%. Further, when the double-form jig 11 with the height of 7 mm Is applied, the reform ratio is 3.1 mm, the height thereof is 5.86 mm and the reform ration is 150%. The reform ratio is calculated by the formula: (the height of the reform bottom portion 3/the height of the bottom mold of a blow mold device)×100.

Breakage tests are completed using the reformed bottles mentioned above. When a double-jig 11 comprising the height of 5 mm is applied, one out of 15 bottles produced breakage. For a double-jig 11 comprising the height of 6 mm, 9 out of 15 bottles produced breakage. For a double-jig 11 comprising the height of 7 mm, 12 out of 15 bottles produced breakage.

Figure 7:
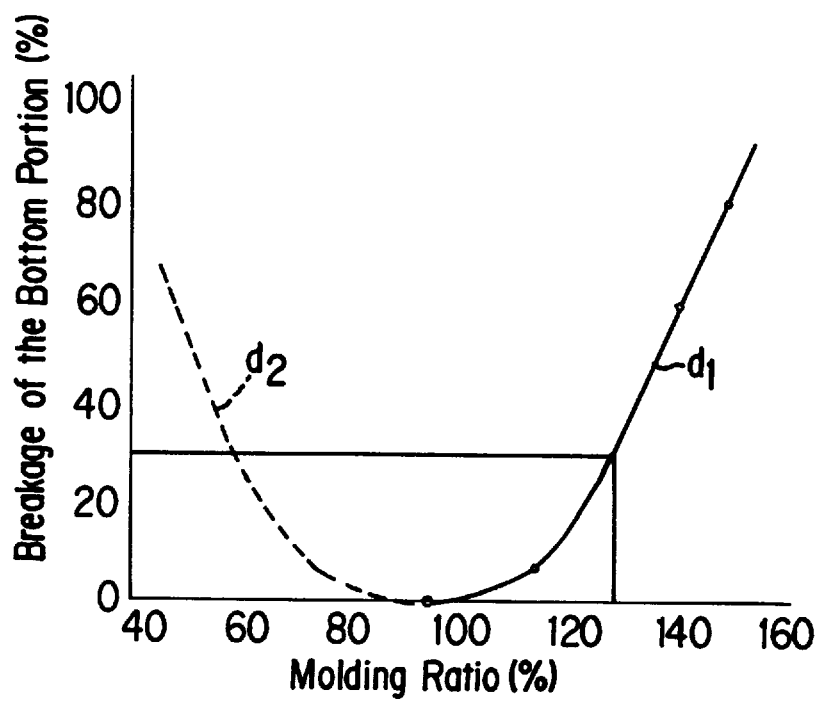
FIG. 7 shows a graph of a breakage ratio of the bottom portion according to reform ratio.
Figure 8:
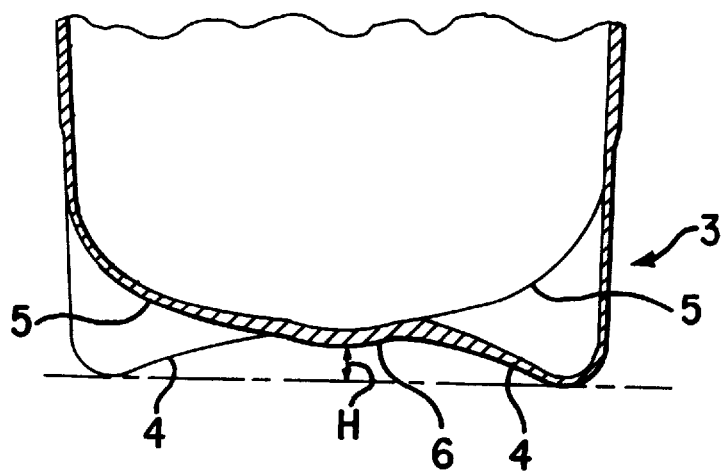
FIG. 8 shows a sectional view of a deformation of a bottom portion of a bottle because of shortage of cooling after release from the mold.

As shown in FIG. 7, since the allowable breakage ratio for the prior art is 30%, the mold ratio according to the present invention is allowed nearly 130%. As the forming capability of the present biaxial blow molding technic is advanced, the mold ratio accordant to the present invention may be limited below 120%.

THE EFFECTS OF THE INVENTION

The present invention performs the following effects.

The bottom portion of the bottle being biaxially stretch molded is cooled right after it is released from the mold, so that shortage of cooling process by the blow mold is covered and that the blowing time of the blow mold can be shortened and the productivity improves.

The bottom portion of the bottle after blow molding is compulsively cooled after releasing from the mold, so that it is not required to prepare a new blow mold, and that bottles are produced with lower cost in equipment.

With a reform jig or a double-form jig, the height of the bottom portion of the bottle can be maintained high enough, so that bottles with higher resistance against the pressure and outer force can be produced.

The cooling apparatus comprises a reform jig or double-form jig, a press jig and a cooling nozzle, so that the component thereof is simple, and that it performs easy handling and operation.

We claim:

1. A molding method for forming a pressure resisting biaxially stretched blow molded bottle having a big foot type petaloid bottom made of synthetic resin, said method comprising:

biaxially stretch blow molding said bottle, including blowing said bottle in a blow mold for about 2 seconds of blowing time;

releasing said bottle from said blow mold while the bottom of said bottle is warm and deformable and placing the bottom of said bottle adjacent a cooling block having a cooling medium passage with an opening directed at a center part of the bottom of said bottle;

placing a cooling nozzle into said bottle; and directing a cooling medium through said cooling medium passage within said cooling block and toward the center part of the bottom of said bottle while directing a cooling medium through said cooling nozzle into said bottle and toward the center of the bottom of said bottle;

wherein said steps of directing a cooling medium decrease a temperature of the center part to below about 70° C. within about 5.5 seconds to about 7.0 seconds, said steps of directing a cooling medium commencing within about 4 seconds after said bottles are released from said blow mold.

2. The molding method as recited in claim 1, wherein said step of placing a cooling nozzle into the bottle and directing a cooling medium toward a center part of each of said bottles results in internal pressurization of said bottles.

3. A molding method for forming a pressure resisting biaxially stretch blow molded bottle, the bottle having a big foot type petaloid bottom made of synthetic resin, said method comprising:

biaxially stretch blow molding said bottle including blowing said bottle in a blow mold for about 1.5 seconds to about 3.0 seconds of blowing time to form said big foot petaloid bottom having a projecting deformation at a center part of the bottom with a predetermined height;

releasing the bottle from the blow mold while the bottom of the bottle is warm and deformable and allowing the height of the projecting deformation to decrease; then forcing the projecting deformation of the center part of the bottom of said bottle onto a reform jig comprising a mold surface having a projecting central portion, said forcing commencing within about 15 seconds after said bottle is released from said blow mold, said projecting central portion thereby pushing said projecting deformation back to at most said predetermined height while an inside of said bottle is pressurized; and directing a cooling medium through a cooling medium passage within said reform jig while directing a cooling medium through a cooling nozzle extended into said bottle so that said cooling medium is directed toward the center of the bottom of said bottle from both the nozzle and the reform jig thereby cooling said center part below about 70° C.

4. The molding method as recited in claim 3, wherein said cooling passage is located substantially at a center of said molded surface and said cooling medium is air.

5. The molding method as recited in claim 3, wherein said cooling medium is air and said step of directing a cooling medium pressurizes said bottles at approximately 6.5 kg/cm².

6. A molding method for pressure resisting biaxially stretch blow molded bottles, each of the bottles having a big foot type petaloid bottom made of synthetic resin, said method comprising:

biaxially stretch blow molding said bottles including blowing said bottles in a blow mold for about 1.5 seconds to about 3.0 seconds of blowing time;

releasing the bottles from the blow mold while the bottom of each bottle is warm and deformable; then forcing a center part of the bottom of each of said bottles onto a double-form jig comprising a mold surface having a projecting central portion to raise a height of the center part while an inside of each of said bottles is pressurized, said forcing occurring within about 15 seconds after said bottles are released from said blow mold; and directing a cooling medium through a cooling medium passage within said reform jig while directing a cooling medium through a cooling nozzle extended into said bottle so that said cooling medium is directed toward the center of the bottom of said bottle from both the nozzle and the reform jig thereby cooling said center part of each of said bottles below about 70° C.

7. The molding method as recited in claim 6, wherein said cooling passage is located substantially at a center of said molded surface and said cooling medium is air.

8. The molding method as recited in claim 6, wherein said cooling medium is air and said step of directing a cooling medium pressurizes said bottles at approximately 6.5 kg/cm².

* * * * *

UNITED STATES PATENT AND TRADEMARK OFFICE
CERTIFICATE OF CORRECTION

PATENT NO. : 5,851,478
DATED : December 22, 1998
INVENTOR(S) : Takao Lizuka, Mamoru Oshida, Makoto Takada It is certified that error appears in the above-identified patent and that said Letters Patent is hereby corrected as shown below:

Title page,
Item 63, change "July 20, 1992" to -- July 20, 1993 --.

Signed and Sealed this

Twenty-eighth Day of August, 2001

Attest:

*Nicholas P. Godici*

NICHOLAS P. GODICI
*Attesting Officer*  *Acting Director of the United States Patent and Trademark Office*